United States Patent Office 2,764,295
Patented Sept. 25, 1956

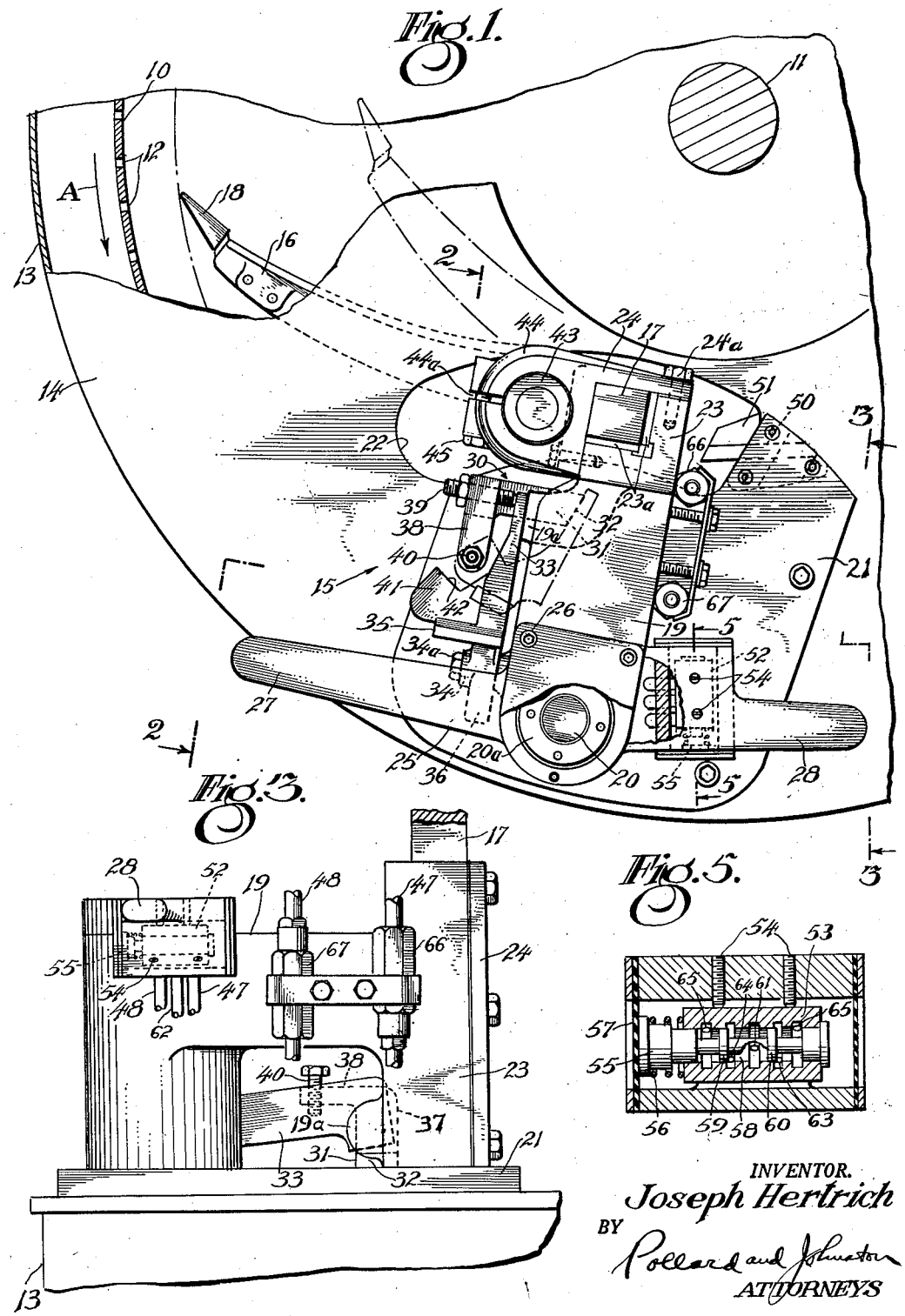

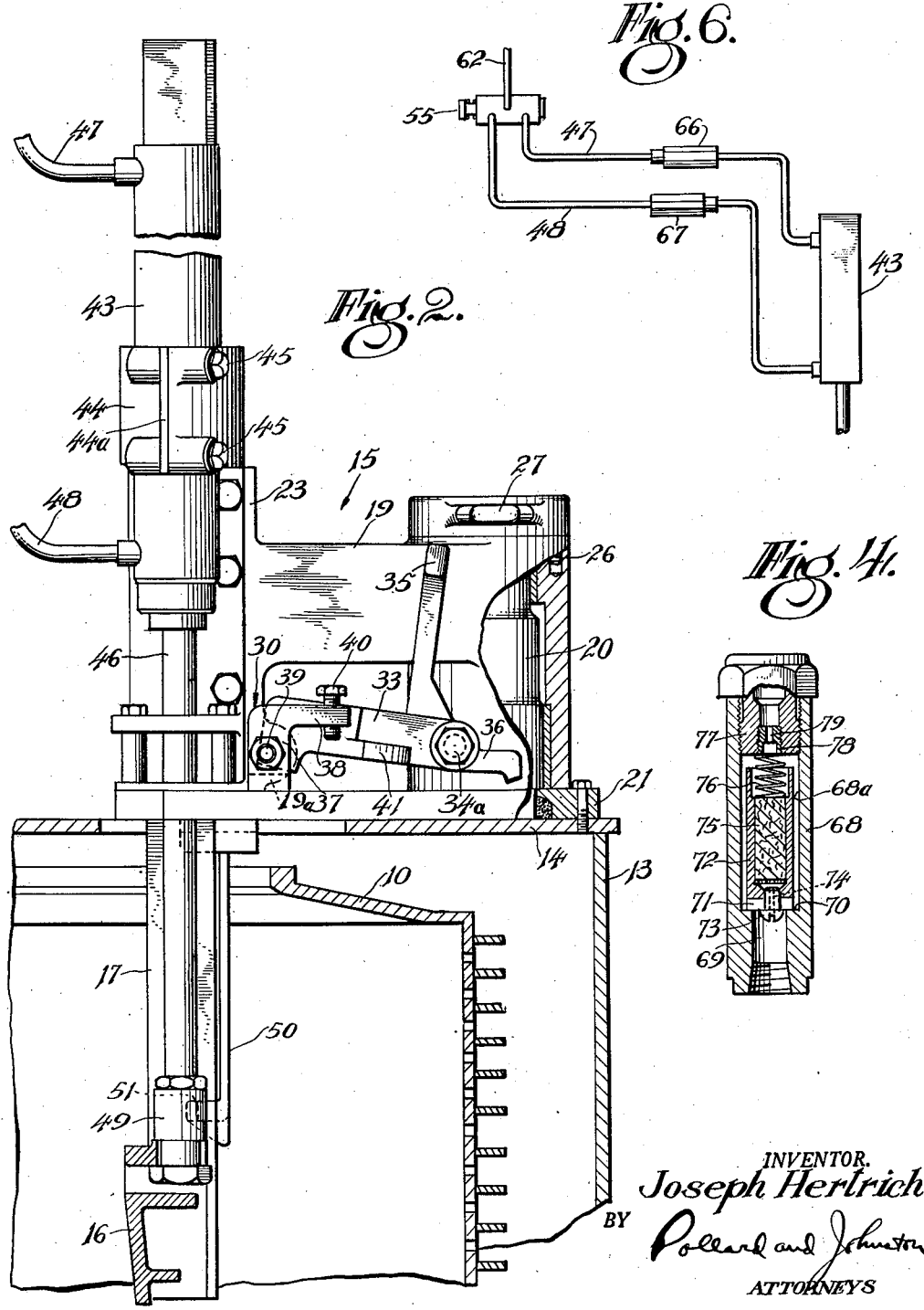

2,764,295
HAND AND AIR OPERATED CENTRIFUGAL DISCHARGER

Joseph Hertrich, Hamilton, Ohio, assignor to The Western States Machine Company, Hamilton, Ohio, a corporation of Utah Application September 9, 1952, Serial No. 308,643

5 Claims. (Cl. 210—70)

This invention relates to new and improved discharger mechanisms for centrifugal machines of the type used in separating liquids from solids, as in the manufacture and refining of sugar.

This application sets forth improvements or modifications of subject matter disclosed in my copending application Serial No. 712,781, now United States Patent No. 2,628,719, issued February 17, 1953.

In sugar centrifugals, sugar massecuite or magma to be treated is delivered into a gyratory basket having a perforated side wall through which syrup in the charge is expelled by the spinning of the basket so as to leave an annular wall of crystalline sugar on the inner side of the perforated basket wall. The crystalline sugar is then removed from the basket by the cutting action of a discharger shoe which is turned into the sugar wall and lowered in the basket as the basket is slowly rotated so as to force the sugar against the shoe. Heretofore, discharging the centrifugal basket has been an arduous task for the attendant, and it has involved serious risks of damage to baskets, basket screws and dischargers, and even of injury to the attendant. The attendant generally has had to control movements of the shoe by manipulating separate actuators, such as a hand wheel for vertical movements and a hand lever for horizontal movements, and he often must also manipulate drive controls in order to maintain a suitable rate of rotation of the basket during the discharging operation. It has required skilled workmen to perform these steps efficiently, and yet, even with experienced operators, damage to the basket linings and to the discharger itself is not uncommon.

The object of this invention is to provide a new and improved discharger which makes it easier and safer for the attendant to discharge centrifugal baskets.

A more specific object of this invention is to provide a new combination of manually and power-actuated elements by which the horizontal and vertical movements of the discharger are easily coordinated and controlled by the attendant while standing in a normal position and without requiring any objectionable reaching or strain, or any complicated arm movements in order to carry out the discharging operations.

According to the present invention, a discharger shoe is movable horizontally within the centrifugal basket by the manual operation of a horizontally movable guide housing which is mounted above the basket and carries in non-rotatable but vertically slidable relation the vertical shaft of the discharger, on the lower end of which is fixed the discharger shoe, and the shaft and shoe are movable vertically in the basket by power operated means carried by the guide housing and controlled by a member accessible to a hand engaging a handle by which an attendant effectuates the horizontal positioning of the housing. The handle is fixed to the housing and positioned so that the attendant can move the discharger both horizontally and vertically while standing in a normal position in front of the centrifugal machine and grasping the handle with his hands and arms in a natural, unstrained position. Moreover, the handle preferably has two branches extending to opposite sides of the axis of the housing assembly and so disposed that the attendant can move the assembly quite easily by direct hand and arm movements without objectionable body movements, and so that the assembly can be positioned by the force of either hand while the other hand is performing some other operation.

Still another feature of the invention is the provision of stop members which coact with abutment members carried by the housing to restrain outward movement of the discharger shoe toward the basket wall at predetermined positions relative to the said wall, and of a trigger operable by a hand engaging the handle for disengaging the coacting members at an intermediate discharging position of the shoe so as to permit further outward movement of the shoe to a final discharging position at the basket wall.

The foregoing and other objects, features and advantages of this invention will become apparent in the following detailed description and the accompanying drawings illustrating a preferred embodiment thereof.

In the drawings:

Figure 1 is a fragmentary plan view of a centrifugal basket and curb assembled with a discharger mechanism embodying this invention, parts of the basket and the curb top being partially broken away to show the discharger shoe in the basket;

Figure 2 is a vertical section taken along line 2—2 of Figure 1, showing one side of the discharger mechanism partly in section and partly in elevation;

Figure 3 is a fragmentary elevation taken approximately at line 3—3 of Figure 1, showing the opposite side of the discharger mechanism;

Figure 4 is a longitudinal cross section of an air flow control preferably used in connection with the discharger mechanism;

Figure 5 is a vertical longitudinal section of an air control valve taken along line 5—5 of Figure 1; and Figure 6 is a schematic diagram of a suitable fluid piping system used with the mechanism.

Referring to the drawings, 10 denotes a conventional centrifugal basket suspended on a gyratory spindle 11 and having apertures 12 through which liquid is expelled under centrifugal force from within the basket. The basket is surrounded by a stationary curb 13 which collects expelled liquid and has a centrally open top 14 which supports the discharger mechanism indicated generally at 15.

The discharger mechanism includes a shoe 16 carried within the basket by a shaft 17. The shoe extends from the shaft in the direction shown in Figure 1 and is movable horizontally and vertically within the basket so that when the basket is rotated in the direction of the arrow in Figure 1 and the shoe is moved into solids on the inner wall of the basket, the cutting tip 18 of the shoe may dig out such solids.

A discharger shaft guide or housing 19 is pivotally mounted for swinging movement above the basket on a stud 20 extending vertically from a base plate 21 bolted to curb top 14. A nut 20a retains the housing in place on the stud. The housing extends from a location near the front edge of the curb inwardly to a free end extending over a cut-away portion 22 of the curb top and base plate, and forms at its free end a vertical guide 23 for slidably supporting discharger shaft 17. Two of the sides of guide 23 are integral with housing 19 and are lined with bushings 23a. The other sides are formed by a flange 24 which is secured to housing 19 by bolts 24a so as to hold the shaft steady in the guide. The shaft and its bearing in guide 23 are square or non-circular in cross section so as to prevent relative rotation of the discharger shoe and the housing, although the discharger shoe can be moved vertically through movement of shaft 17 in guide 23. It is apparent that by swinging housing 19 with shaft 17 about stud 20, discharger shoe 16 can be swung outwardly and inwardly to and from the side wall of the basket.

A handle 25 is fixed by cap screws 26 to a top portion of the housing adjacent to the pivot pin or stud 20 and is disposed low enough so as to enable an attendant to grasp the handle with his hands and arms in a natural, unstrained position for moving the housing assembly. The handle has branches 27 and 28 extending in a horizontal plane to opposite sides of the axis of the housing, so that the attendant can swing the assembly about the stud 20 by direct hand and arm movements without objectionable or strained body movements, and so that the assembly can be swung about the stud with the same relative ease by the force of either hand while the other hand is performing some other operating condition of the machine, for example, manipulating a centrifugal drive control or switch to control the speed of rotation of the basket.

The vertical movements of the discharger shoe 16 are brought about by the action of a double-acting fluid pressure device comprising a vertical air cylinder 43 disposed alongside shaft 17 and supported on the swingable housing by a bracket 44 which is integral with the above mentioned flange 24. The bracket is split vertically at 44a but its two sections are held firmly against the cylinder under the force of bolts 45 joining the sections. The cylinder contains a piston (not shown) to work its plunger 46 which is attached at its lower end to the discharger shoe 16 by a disengageable coupling 49. The stroke of the plunger is such that it moves the shoe between upper and lower limits at the top and bottom of the basket, respectively. Air pressure is supplied to the cylinder 43 by conduits 47 and 48, conduit 47 being connected to the upper part of the cylinder to supply downward pressure on the piston to lower the plunger and shoe, and conduit 48 being connected to the lower part of the cylinder to supply an upward pressure on the piston to raise the plunger and shoe.

Bolted to the lower side of a portion of base plate 21 which overhangs the central opening of the basket is a depending bracket 50 which has a horizontal ledge 51 extending toward the discharger shaft 17 at a depth in the basket just below the lower edge of the shoe when the shoe is in its upper position. Accordingly, when the shoe 16 is swung inward after being moved to its upper position, the base of the discharger shoe moves over the face of the ledge 51 and butts the vertical section of bracket 50 which acts as a stop to check clockwise rotation of the housing and shoe. Thus, the shoe is brought to an idle position in which the ledge 51 keeps it from falling in the basket 10, even if the pressure in the lower side of the cylinder 43 is released or fails.

Flow of air pressure to and from the upper and lower parts of the cylinder 43 is controlled by an air valve 52 mounted within branch 28 of the handle 25. This valve has a valve body 53 fixed relative to the handle by set screws 54 and a relatively movable element or plunger 55. The plunger is normally biased by a spring 56 to a shoe raising position, but is movable inwardly, for example, by the thumb of a hand engaging branch 28 of the handle, to a shoe lowering position and also to a neutral position in which the shoe is not urged in either direction. A resilient diaphragm 57 fixed to the handle 25 encloses the valve 53 in the handle but permits actuation of the plunger 55.

While various valves may be used to perform these functions, a preferred embodiment is the so-called "Beckett" air valve, as shown in Figure 5. The plunger 55 is movable in a chamber 58 of the valve body and has pistons 59 and 60 formed thereon. The chamber 58 is connected through a centrally located port 61 to a fluid pressure supply line 62; through ports 63 and 64, axially spaced from the port 61 on opposite sides thereof, to cylinder conduits 47 and 48, respectively; and through vents 65 near opposite ends of the valve body to the atmosphere. The pistons 59 and 60 are spaced from each other to control the flow of air pressure to and from the cylinder 43 in the manner described hereinafter. When the plunger 55 is in its normal shoe raising position, piston 59 is disposed between port 64 and vent 65 and piston 60 is disposed between ports 63 and 61 so as to connect air pressure supply line 62 with conduit 48 to admit air pressure into the lower part of cylinder 43 for holding the shoe 16 in its raised position, conduit 47 then communicating with vent 65 to release pressure from the upper part of cylinder 43. To admit air pressure into the upper part of the cylinder 43 for lowering the shoe 16, plunger 55 is pressed to its fully inward position where piston 59 is disposed between ports 64 and 61 and piston 60 is between port 63 and vent 65 so as to connect air pressure supply conduit 62 with conduit 47 and connect conduit 48 with vent 65. Between these extreme positions, plunger 55 passes through an intermediate position in which the pistons close ports 48 and 47 to prevent movement of the shoe in either direction.

Air flow controls 66 and 67 are placed in conduits 47 and 48, respectively, to regulate the rate of air flow in these conduits between chamber 58 and cylinder 43 so that the shoe is raised or returned to the top of the basket in a non-working stroke faster than it is lowered through its working stroke. The construction of the two air flow controls is the same, and is shown in detail in Figure 4. However, the position of control 66 in conduit 47 is reverse to the position of control 67 in conduit 48. The body 68 of each control is cylindrical and has a cylindrical cavity 68a therein. One end of cavity 68a opens into a passage 69 and presents an annular seat 70 for a non-metallic valve disc 71 secured by a cap screw 73 having a restricted orifice 74 to a hollow plunger 72 which is disposed in the cavity. The hollow plunger is packed with air filtering medium 75 and is normally biased toward a seated position by a spring 76. An axially bored plug 77 is screwed into the other end of the cavity and holds a removable member 78 having an orifice 79. Orifice 79 is larger than orifice 74. Thus, the rate of flow in the direction 79 to 69 is restricted since the air must pass through orifices 79 and 74, while the rate of flow in the opposite direction is faster since the air displaces plunger 72 from its seated position to permit orifice 74 to be by-passed between the sides of the plunger and cavity 68a.

The reversed arrangement of the two flow controls in conduits 47 and 48 results in the full restrictive effect of each flow control being exerted during the downward movement of the discharger, when air is being forced into the upper part of cylinder 43 and being forced from the lower part of the cylinder, so that a smooth gradual motion is obtained on the downward discharging movement of the shoe 16. The rate of this motion can be fixed at any desired value by selection of the size of the small orifices 74. On the other hand, only the larger orifices of the two flow controls are effective during the upward movement of the discharger, when air is being forced into the lower part and from the upper part of the cylinder; so a relatively fast upward movement of the shoe is obtained at a rate that may be determined by selection of the size of the orifices 79.

To safeguard the machine and the attendant, the swinging housing 19 is provided with means for normally locking or latching it at an idle position where the shoe 16 lies over ledge 51 and away from the sugar wall, and with further means for limiting the counterclockwise movements of the housing so that the outward shoe movement normally will be checked at an intermediate discharging position, before the shoe tip comes very near to the basket side wall, and so that the final outward movement of the shoe to dispose its tip at the basket wall can be effected only by a distinct deliberate act of the attendant operating the discharger. These means, furthermore, are so arranged, in relation to the swinging housing and to the handle manipulated by the attendant, that the latching and motion limiting means can be actuated by a fingoer or fingers of a hand by which the attendant is positioning or moving the housing assembly.

On one side of the housing a detent 33 is pivotally carried by the housing on a stud 34. Nut 34a retains the detent on the stud. The free end of the detent normally falls under its own weight toward the base plate 21 but may be raised by manipulation of a trigger 35 fixed to detent 33 and accessible to a hand engaging branch 27 of handle 25. The detent has a finger extension on the other side of its pivotal axis which is adapted to butt base plate 21 to limit the detent movement.

A bracket 30 is fixed to the base plate 21 in any suitable manner, as by welding, on the side of the housing carrying the detent 33. The bracket has a horizontally extending plate 31 on the top surface of the base plate and an upright angular piece formed with vertical and horizontal portions 37 and 38 which are threaded to receive adjustable set screws 39 and 40, respectively. In the inner position of the housing, detent 33 abuts the end face 32 of plate 31 so as to prevent outward, counterclockwise movement of the guide housing. Set screw 39 lies in the path of outward movement of, and is engaged successively by detent 33 and by abutment 19a integral with housing 19, so as to check the horizontal discharging movements of the housing 19 and shoe 16 first at the intermediate position and later at the outermost desired position of the shoe relative to the basket.

Before the attendant can swing the housing and shoe outwardly toward the basket wall from the inner and the intermediate positions, the trigger must be manipulated to raise the detent above plate 31 and set screw 39, respectively. Moreover, the detent is provided with a flat lateral extension 41 which is disposed beneath set screw 40 in the inner position of the housing so as to butt the screw as the detent is raised to prevent the detent from being raised above the level of screw 39 until the housing is moved to the intermediate position. Extension 41 is terminated at an edge 42 which reaches a position clear of the set screw 40 when the housing reaches its intermediate position, so that the attendant can by further manipulation of the trigger raise detent 33 above the level of the screw 39 so as to permit further movement of the housing and shoe to the outermost position. Thus, when the attendant swings the housing to move the shoe outward from its inner position, the detent is constrained to move in a path in which it will normally engage set screw 39 so as to stop the outward movement at a desired intermediate position determined by the setting of screw 39. Only a deliberate act of the attendant, performed when the shoe has reached or approached the intermediate position, can lift detent 33 above screw 39 so as to clear the mechanism for the final outward discharging movement. When that movement is brought about, detent 33 is raised above stop screw 39, but the final outward movement brings abutment 19a on the housing into contact with this screw so as to stop the outward movement at a desired position in relation to the basket screens.

A complete cycle of operation will now be described:

Assuming that the centrifuging or running period of the machine has been completed, the speed of the basket 10, which is rotating in the direction of arrow A (Figure 1), must be reduced to a suitable low speed for discharging. When the speed has been reduced and the basket is ready to be discharged, the attendant stands in front of the discharger and grasps branches 27 and 28 of handle 25 with his hands and arms in a natural, unstrained position to effect the discharging movements of shoe 16.

In order to move the housing and shoe outwardly, trigger 35 is manipulated by the index finger of the hand engaging branch 27 of handle 25 so as to raise the detent above the level of plate 31, and the housing 19 is swung by the attendant in a horizontal plane about stud 20 to move the discharger shoe into the wall of rotating solids. Such horizontal swinging may be effected by direct hand and arm movements without requiring the attendant to shift his body weight or his footing. Furthermore, the housing may be swung outwardly with equal ease by the force of either hand, thereby permitting the attendant to use his other hand to perform other operations.

The shoe is moved outwardly into the solids until detent 33 butts set screw 39 so as to check the horizontal movement of the shoe at the intermediate position in which the shoe is spaced from the basket wall as shown in full lines in Figure 1. After a first cut or swath has been thus taken from solids at the top of the basket, the shoe may be moved vertically downwardly in the basket to dig out all solids at the depth of the first cut. Then the shoe may be raised, then swung farther outwardly in a second outward cut to reach the basket side wall, and then lowered again to complete the removal of solids from the basket. Alternatively, the second outward cut may be taken before any downward movement of the shoe, so that after a complete swith of solids has been removed at the top of the basket charge, the remainder of the charge will be removed by a single downward stroke of the shoe.

In order to proceed with a second outward cut, trigger 35 is again manipulated by the attendant's left hand, so as to raise detent 33 above the level of screw 39, and the attendant then swings the housing assembly farther in counterclockwise direction by manipulation of the handle 25. At the desired limit of the second outward cut, as determined by the setting of screw 39, the end of this screw butts against member 19a on the housing so as to stop the shoe tip 18 at a position where it is not likely to dig into or damage the screens on the basket side wall.

To bring about a downward stroke of the discharger shoe, the attendant, while holding handle 25 so as to maintain the desired horizontal position of the shoe, simply presses against diaphragm 57 and plunger 55 of valve 52 with the thumb of his right hand, whereupon air pressure is admitted to the upper part of cylinder 43 and the plunger of this cylinder slowly lowers the shaft 17 and shoe 16 to the bottom of the basket.

After the shoe has completed its downward stroke and all the solids have been dug out, the shoe 16 is moved inwardly away from the side wall of the basket by swinging housing 19 clockwise about stud 20 until discharger shaft 17 butts ledge 51 of bracket 50. Plunger 55 is then released to admit air pressure to the bottom of cylinder 43 so as to raise shoe 16 to the top of the basket. At the top of the basket, housing 19 is swung farther inwardly to the inner or idle position so as to move shoe over the face of ledge 51, until the shoe 16 or shaft 17 butts the upright portion of bracket 50. In this position, detent 33 falls behind face 32 of plate 31. Thus, the shoe is prevented from being moved horizontally from this position and is also prevented from falling in the basket in the event of air pressure failure.

It is to be understood that the detailed description and the accompanying drawings are illustrative and that the improvements herein disclosed may be embodied in various forms of construction within the scope of the appended claims, as will be apparent to those skilled in the art.

What is claimed is:

1. In a discharger mechanism for removing solids from a rotating centrifugal basket, a movable guide housing, a discharger shaft carried nonrotatably but slidable vertically in said guide housing, a solids discharging shoe carried by said shaft, means to mount said guide housing above said basket for movement in a horizontal plane so as to move the shoe from an inner idle position within the basket outwardly toward the basket side wall, a detent carried with and pivotally mounted on the guide housing, two spaced stops in the path of said detent for engaging it to block outward movements of the shoe at predetermined positions, a handle fixed to and extending from the guide housing for manual operation to move the housing assembly horizontally, a trigger coacting with said detent and operable by a hand engaging said handle to disengage said detent from each of said stops, one of said stops being engaged by said detent to block horizontal movement of said housing when said shoe is disposed in said inner idle position, said detent being then liftable by said trigger to an intermediate position at which it is disengaged from said one stop but will engage the other of said stops after a predetermined horizontal movement of the housing assembly away from idle position, and means operative in the course of such horizontal movement to prevent displacement of said detent away from such intermediate position.

2. In a discharger mechanism for a centrifugal machine including a basket that rotates on a vertical axis, has a centrally open top and lies inside a fixed casing having a top over the basket top formed with an opening aligned with the opening of the basket top, the combination comprising a vertical pivot pin in fixed position on the casing top, a movable guide housing swiveled on said pin and having a forward portion protruding from said pin toward the basket axis so as to overhang the top openings of said casing and basket, a discharger shaft carried nonrotatably but slidable vertically in said forward portion, a solids discharging shoe carried by said shaft, a double-acting vertical fluid pressure cylinder carried by the guide housing and having its plunger connected to said shoe for moving the shoe vertically in the basket, separate conduits for leading fluid under pressure to and from upper and lower parts of said cylinder, respectively, a handle fixed to said guide housing and having two branches extending horizontally from the housing substantially in opposite directions from locations near the pivot pin for conveniently swinging the housing assembly about said pivot pin by the hands of an attendant, and control means connected with said conduits and having a movable control element positioned on one of said branches for operation by a hand engaging said one branch so as to supply fluid under pressure into either of said conduits while venting the other conduit.

3. A discharger apparatus as described in claim 2, wherein said control means comprises a fluid valve having as said control element a plunger movable by a finger of such hand engaging said one branch.

4. A discharger apparatus as described in claim 2, and a flow controller in each of said conduits to impose a slower rate of flow to the upper part of the cylinder than to the lower part.

5. In a discharger mechanism for a centrifugal machine including a basket that rotates on a vertical axis, has a centrally open top and lies inside a fixed casing having a top over the basket top formed with an opening aligned with the opening of the basket top, the combination comprising a vertical pivot pin in fixed position on the casing top, a movable guide housing swiveled on said pin for movement in a horizontal plane about said pin, a discharger shaft carried nonrotatably but slidable vertically in said housing, a solids discharging shoe carried by said shaft, a fluid pressure cylinder carried by said guide housing and having a vertically reciprocable plunger connected to said shoe for moving the shoe vertically in the basket, abutment means carried by said housing and cooperating relatively fixed stop means in the path of said abutment means to block outward movements of the shoe at predetermined positions, a handle fixed to the housing and having two branches extending horizontally from the housing substantially in opposite directions from locations near the pivot pin for conveniently swinging the housing assembly about said pivot pin by the hands of an attendant, means mounted on one of said branches and operable by a hand engaging said one branch to activate and inactivate said cylinder, and a trigger connected with said abutment means and movable to disengage said abutment means from said stop means, said trigger being positioned for operation by a hand engaging the other of said branches.

References Cited in the file of this patent

UNITED STATES PATENTS

| | | |
|---|---|---|
| 1,202,936 | White | Oct. 31, 1916 |
| 2,063,472 | Tholl | Dec. 8, 1936 |
| 2,522,779 | Culkosky | Sept. 19, 1950 |
| 2,628,719 | Hertrich | Feb. 17, 1953 |